(No Model.)

G. W. MERRILL.
SAWING MACHINE.

No. 279,967. Patented June 26, 1883.

Witnesses:
E. H. Bates,
M. S. Walling

Inventor.
George W. Merrill.
By Frank Sheehy
Attorney.

UNITED STATES PATENT OFFICE.

GEORGE W. MERRILL, OF EAST SAGINAW, MICHIGAN.

SAWING-MACHINE.

SPECIFICATION forming part of Letters Patent No. 279,967, dated June 26, 1883.

Application filed February 27, 1883. (No model.)

*To all whom it may concern:*

Be it known that I, GEORGE W. MERRILL, of the city of East Saginaw, county of Saginaw, State of Michigan, have invented a new and useful machine for cutting down trees and for cutting up logs and timber and wood, which machine is fully set forth and described in the following specification and accompanying drawings, in which—

Figure 1:
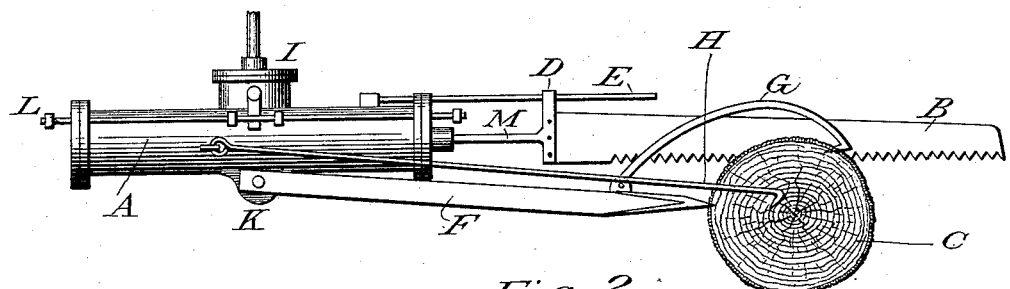
Figure 2:
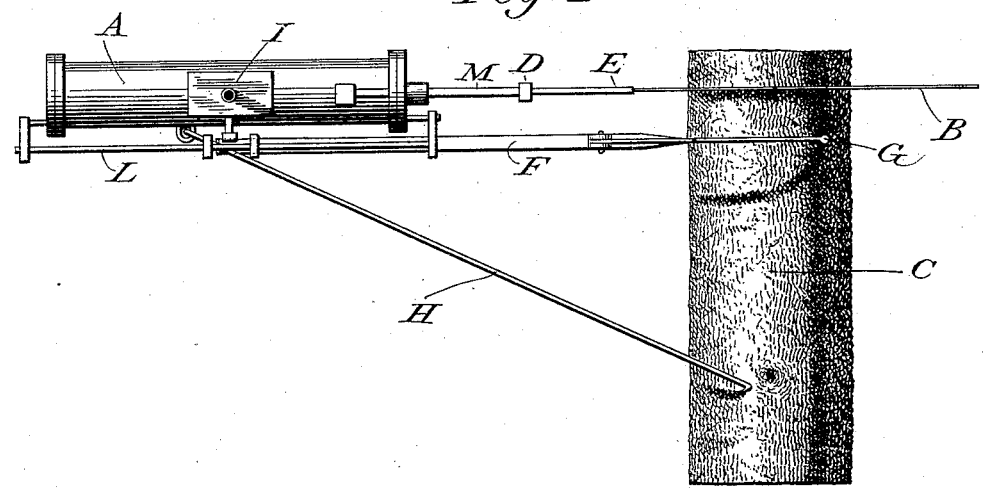

Figure 1 is a side view of the machine in operation on a log, and Fig. 2 is a top view of the same, the same letters referring to the same parts of both views.

A is the cylinder.

B is the saw, attached directly to the piston M by means of the cross-head D.

E is the guide-rod upon which the cross-head D slides to hold the saw from turning. The movement of the piston with saw attached is controlled by any suitable valve, operated as by the tappets L or other equivalent device, as in steam-pumps, and the power is derived from compressed air.

F is a wooden or metal bar with steel point, and G is a hook, both operating together as an ordinary cant-hook for rolling logs. The bar F holds the weight of the cylinder at the pivot K, by means of which the saw can be moved up or down through the log.

H is a brace-hook, jointed to the cylinder at one end and driven into the log at the other end to hold the machine from moving sidewise.

In constructing this machine the intention is to make all the parts as light and small as is consistent with the required strength, in order that it may be readily carried from one cut to another, one man being able to operate the small sizes.

The method of operation is this: Hook the cant-hook G into the log or tree and then bear on the bar F, so as to force its steel point into the log or tree. Then drive in the hook of the brace-rod H, so as to hold the machine in the desired position, and then admit the compressed air by means of suitable stop-valve. The pressure on the saw or its feed is regulated by bearing down or lifting with the hand at either end of the cylinder.

It is the intention in operating this machine to locate at some central or convenient point an air-compressor driven by steam-engine or other power, and to convey the compressed air by means of pipes or hose, or both combined, to one or more of these machines in different directions, operating on one or more logs or trees at the same time.

The advantage claimed is that one man can manage the engine and compressor and furnish power for several machines, and each machine operated by one man will do easily much more work than two men by hand in the ordinary way, and by the use of hose to convey the compressed air its flexibility allows the machine to be placed in any position.

This machine thus operated is especially designed to enable owners of blast-furnaces using charcoal for fuel to cut large amounts of wood with fewer men, and not be obliged to shut down their furnaces for lack of fuel, as is now the case in many districts where timber is plenty but labor scarce.

Having thus described my invention, what I claim as my invention, and desire to secure by Letters Patent, is—

The combination, with the cylinder A, of the reciprocating saw B and its actuating mechanism, the pointed rod F, pivoted to said cylinder, the cant-hook G, pivoted to said rod F, and the hooked rod H, pivoted to the cylinder, the whole arranged to operate substantially as and for the purposes specified.

GEORGE W. MERRILL.

Witnesses:
WILLIAM MERRILL,
SYLVANIS S. MITTS.